(12) United States Patent
Schönlechner et al.

(10) Patent No.: US 10,053,139 B2
(45) Date of Patent: Aug. 21, 2018

(54) DAMPING ECCENTRIC MOTION LINK IN CEPS USAGE

(71) Applicant: THYSSENKRUPP PRESTA AG, Eschen (LI)

(72) Inventors: Johannes Schönlechner, Gaschurn (AT); Christian Kohler, Heiligkreuz (CH)

(73) Assignee: THYSSENKRUPP PRESTA AG, Eschen (LI)

( * ) Notice: Subject to any disclaimer, the term of this patent is extended or adjusted under 35 U.S.C. 154(b) by 422 days.

(21) Appl. No.: 14/889,072

(22) PCT Filed: Apr. 30, 2014

(86) PCT No.: PCT/EP2014/058877
§ 371 (c)(1),
(2) Date: Nov. 4, 2015

(87) PCT Pub. No.: WO2014/180736
PCT Pub. Date: Nov. 13, 2014

(65) Prior Publication Data
US 2016/0121921 A1 May 5, 2016

(30) Foreign Application Priority Data

May 8, 2013 (DE) .................. 10 2013 007 883

(51) Int. Cl.
*F16H 55/24* (2006.01)
*B62D 5/04* (2006.01)
(Continued)

(52) U.S. Cl.
CPC ......... *B62D 5/0409* (2013.01); *B62D 5/0403* (2013.01); *F16H 19/001* (2013.01);
(Continued)

(58) Field of Classification Search
CPC ........ F16H 19/001; F16H 25/24; F16H 55/24; B25D 5/0409; B25D 5/0403
(Continued)

(56) References Cited

U.S. PATENT DOCUMENTS 1,072,282 A * 9/1913 Waninger .................. F16H 1/16
384/255
2,335,606 A * 11/1943 Pelphrey .................. F16H 1/16
74/396
(Continued)

FOREIGN PATENT DOCUMENTS

CN 202593606 U 12/2012
DE 102007019324 A1 11/2007
(Continued)

OTHER PUBLICATIONS

International Search Report for International Patent Application No. PCT/EP2014/058877; dated Jul. 18, 2014.
English language Abstract for CN 202593606 U listed above.

*Primary Examiner* — William C Joyce
(74) *Attorney, Agent, or Firm* — thyssenkrupp North America, Inc.

(57) ABSTRACT

An electromechanical servo steering system may include an electric servomotor that drives a worm shaft that meshes with a worm wheel arranged on a steering shaft. The worm wheel is operatively connected to an input shaft of a steering gear mechanism, and the worm shaft and the steering shaft are rotatably mounted in a common gear mechanism housing. The worm shaft has a free end that is remote from the motor and an end that is close to the motor. The end that is remote from the motor is mounted in a rolling bearing, and the end that is close to the motor has a rolling bearing that is received in an eccentric lever.

12 Claims, 7 Drawing Sheets

(51) Int. Cl.
*F16H 19/00* (2006.01)
*F16H 57/021* (2012.01)
*F16H 25/24* (2006.01)

(52) U.S. Cl.
CPC ............ *F16H 55/24* (2013.01); *F16H 25/24* (2013.01); *F16H 2057/0213* (2013.01)

(58) Field of Classification Search
USPC .................................................. 74/409, 425
See application file for complete search history.

(56) References Cited

U.S. PATENT DOCUMENTS

| | | | | |
|---|---|---|---|---|
| 3,429,201 | A * | 2/1969 | Zucchellini | B23Q 5/46 184/45.1 |
| 4,621,405 | A * | 11/1986 | Cook | B23Q 5/56 29/27 C |
| 6,357,313 | B1 * | 3/2002 | Appleyard | B62D 5/0409 74/388 PS |
| 6,398,400 | B1 * | 6/2002 | Nienhaus | F16C 23/10 384/255 |
| 9,051,003 | B2 * | 6/2015 | Galehr | B62D 5/0409 |
| 2004/0026160 | A1 * | 2/2004 | Shimizu | B62D 5/0409 180/444 |

FOREIGN PATENT DOCUMENTS

| | | |
|---|---|---|
| DE | 102009016187 A1 | 10/2010 |
| EP | 2497975 A1 | 9/2012 |
| WO | 1999/065758 A1 | 12/1999 |
| WO | 2006/105900 A1 | 10/2006 |
| WO | 2012/136315 A1 | 10/2012 |

* cited by examiner

DAMPING ECCENTRIC MOTION LINK IN CEPS USAGE

CROSS REFERENCE TO RELATED APPLICATIONS

This application is a U.S. National Stage Entry of International Patent Application Serial Number PCT/EP2014/058877, filed Apr. 30, 2014, which claims priority to German patent application no. DE 102013007883.0 filed May 8, 2013, the entire contents of both of which are incorporated herein by reference.

FIELD

The present disclosure relates to an electromechanical servo steering system.

BACKGROUND

A generic electromechanical servo steering system has an electric servomotor which drives a worm shaft which meshes with a worm wheel arranged on a steering shaft, wherein the worm wheel is operatively connected to an input shaft of a steering gear mechanism, and wherein the worm shaft and the steering shaft are rotatably mounted in a common gear mechanism housing.

The laid-open specification WO 2012/136315 discloses an arrangement in which the position of the worm shaft relative to the worm wheel is adjustable. In this case, the adjustment is performed by way of an actuator or a spring preload with the aid of a motion link on that side of the worm shaft which is "remote from the motor", whereas the mounting of the worm is realized at the motor side. The adjustment of the position of the worm shaft relative to the worm wheel makes it possible to correct the play that arises, for example as a result of wear, during operation.

It is desirable for the worm wheel to be run in in the installed state. For this purpose, the worm must be subjected to a significantly greater preload, which is however possible only in the case of motor-side attachment of the motion link.

EP 2 497 975 has disclosed a pressure-exerting device which is mounted at the motor side and in the case of which a torsion spring is situated concentrically with respect to the worm axis and which drives an eccentric apparatus.

SUMMARY

It is therefore an object of the present invention to provide a motor-side motion link for a worm shaft bearing arrangement in the gear mechanism of an electromechanical servo steering system, wherein both the axial play and the radial play are automatically adjustable.

Said object is achieved by way of an apparatus having the features of claim 1.

Because it is provided that, in an electromechanical servo steering system having an electric servomotor which drives a worm shaft which meshes with a worm wheel arranged on a steering shaft, wherein the worm wheel is operatively connected to an input shaft of a steering gear mechanism, and wherein the worm shaft and the steering shaft are rotatably mounted in a common gear mechanism housing, the worm shaft has a free end which is remote from the motor and which is mounted in a rolling bearing, and the worm shaft additionally has an end which is close to the motor, wherein that end of the worm shaft which is close to the motor is mounted in a rolling bearing which is received in an eccentric lever, any radial play of the worm shaft relative to the worm wheel can be minimized with even greater effectiveness. Here, it is preferably the case that the eccentric lever is fastened pivotably to the housing by means of a bearing.

If, furthermore, the bearing has a pin surrounded by a helical spring, which pin serves for the mounting of the eccentric lever pivotably on the housing, and a hook of the helical spring engages on a notch of the eccentric lever and preloads the pivoting movement of the eccentric lever, it is possible to realize a compact arrangement. It is advantageously the case that the eccentric lever is preloaded by means of the helical spring such that the worm shaft is forced into engagement with the worm wheel.

The worm shaft can be preloaded independently of the electric motor if, on that side of the eccentric lever which is close to the motor, there is arranged a coupling which compensates an axial offset. Here, it may advantageously be provided that the coupling has two coupling parts which engage into one another and which are in each case connected rotationally conjointly to the corresponding shaft by way of a bearing bushing. In particular, the coupling parts may engage into one another with a degree of play which compensates an axial offset.

Quiet and in particular play-free running is realized if the coupling has an elastomer damping means which dampens the play of the coupling parts.

It is advantageous if the bearing bushings have, at the inside, a helical spring which preloads the worm shaft axially relative to the worm wheel.

The arrangement is particularly compact if the rolling bearing on the free end of the worm shaft is a needle-roller bearing.

BRIEF DESCRIPTION OF THE DRAWINGS

The present disclosure is described in detail below with reference to the attached drawing figures, wherein.

DETAILED DESCRIPTION

Exemplary embodiments of the present disclosure will be described below with reference to the attached figures, in which like reference characters denote like elements.

FIGS. 1 to 4 show the prior art as per WO 2012/136315.

Figure 1:
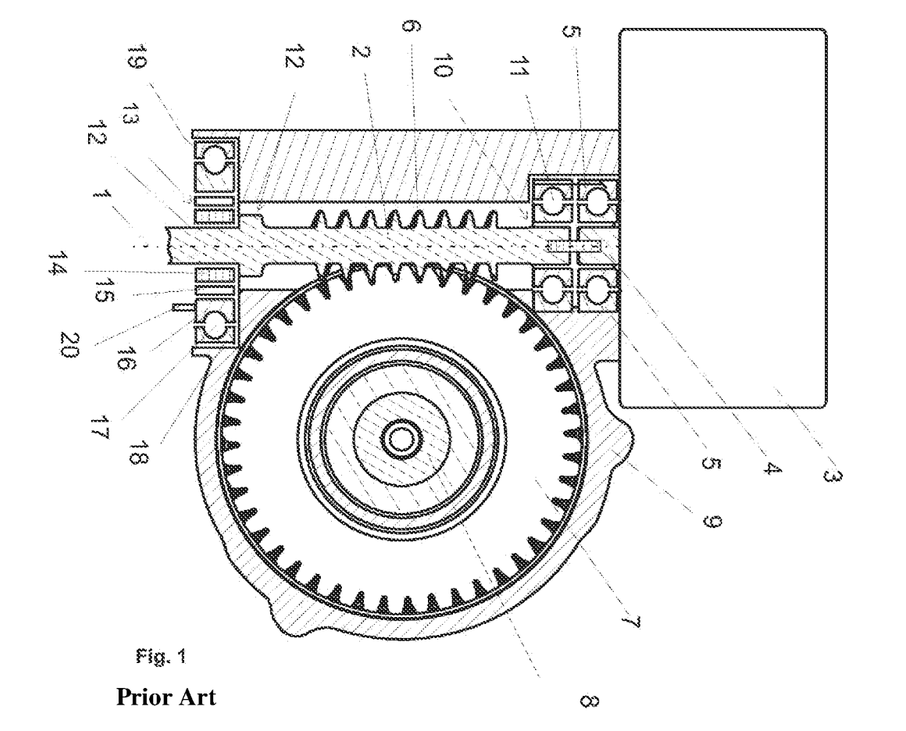
FIG. 1 is a cross-sectional view taken across a longitudinal section of a worm shaft showing a prior art gear mechanism of the servo steering system shown in WO 2012/136315.

FIG. 1 illustrates, in a longitudinal section, the gear mechanism of an electromechanical servo steering system. Here, the longitudinal section runs along an axis of rotation 1 of a worm shaft 2, which is driven by an electric motor 3. The electric motor 3 has a motor shaft 4 which is coupled rotationally conjointly to the worm shaft 2 by way of a flexible coupling 5. The worm shaft 2 meshes, by way of a worm toothing 6, with a worm wheel 7. The worm wheel 7 is in turn connected rotationally conjointly to a steering shaft 8, which runs between a steering wheel (not illustrated) and the steering gear mechanism itself of the motor vehicle. The stated structural elements are mounted in a common gear mechanism housing 9.

The mounting of the worm shaft 2 in the housing 9 is realized at a motor-side end 10 of the worm shaft 2 in a conventional rolling bearing 11, which is in the form of a ball bearing. The ball bearing 11 is designed such that the worm shaft 2 can perform small axial movements and small adjustments of the axis of rotation 1 relative to the housing 9. The worm shaft 2 furthermore has an end 12 which is remote from the motor and which is likewise mounted in a rolling bearing 13. The rolling bearing 13 has an inner ring 14, rolling bodies 15 and an intermediate ring 16. The intermediate ring 16 itself is in turn equipped, on its outer side, with a raceway channel for balls 17. The balls 17 run in an outer ring 18, which is finally fastened in a bearing seat 19 of the housing 9. Finally, the intermediate ring 16 is equipped with a pin 20 which is fastened to that side of the intermediate ring 16 which is averted from the housing 9. The intermediate ring 16 is designed such that, on the inner side thereof, there is formed a raceway for the rolling bodies 15 of the inner bearing 13. Said raceway is of substantially cylindrical form, as in this exemplary embodiment, the rolling bodies 15 are provided in the form of needle rollers. On its outer circumferential surface, the intermediate ring 16 is equipped with a ball raceway for the balls 17 which run on the outside, wherein the outer raceway is not arranged concentrically with the inner raceway. This means that, when the worm shaft 2 rotates, the intermediate ring 16 defines the position of the axis of rotation 1, whereas the inner rolling bearing 13 realizes the easy and play-free rotatability of the worm shaft 2 relative to the intermediate ring 16. By contrast, a rotation of the intermediate ring 16 effects a displacement of the axis of rotation 1 of the worm shaft 2, and thus a change in the meshing of the worm 6 with the worm wheel 7. In this way, it is possible in particular to realize an advancing movement of the worm shaft 2 toward the worm wheel 7 in order to attain play-free tooth meshing.

In this arrangement, the intermediate ring 16 is likewise mounted in rolling fashion relative to the housing 9 by way of the rolling bodies 17. In particular, the intermediate ring 16 itself forms a part of said outer bearing, which is formed from the intermediate ring 16, the rolling bodies 17 and the bearing outer ring 18. This arrangement permits very free-moving adjustment of the intermediate ring 16, even when the latter is under load. In this way, the position of the worm shaft 2, more precisely of the axis of rotation 1 of the worm shaft 2, in relation to the worm wheel 7 can be adjusted particularly finely and responsively.

Figure 2:
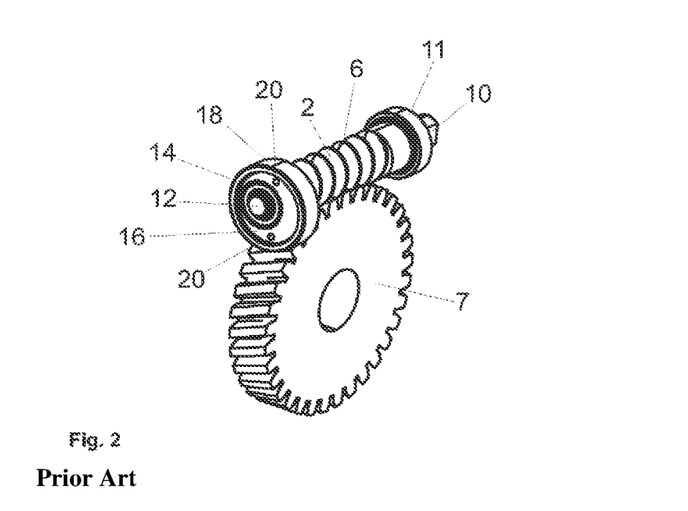
FIG. 2 is a perspective view of a prior art worm shaft with a bearing arrangement as shown in WO 2012/136315.

FIG. 2 shows the worm shaft with the rolling bearings, and the worm wheel 7 which meshes with the worm shaft, in a perspective illustration, wherein the components of the housing and of the electric motor are not shown. Here, the intermediate ring 16 is equipped with two actuation elements 20. Said actuation elements 20 may serve as engagement points for springs for elastic preloading, as will be described below with regard to FIG. 3. Said actuation elements may also serve as engagement points for an electric actuator, which actuates the intermediate ring 16 in a manner defined by a controller or regulator.

In FIG. 2, it can be seen that the axis of rotation of the worm shaft 2 is arranged concentrically with respect to the inner ring 14 and with respect to the inner raceway of the intermediate ring 16, but lies eccentrically with respect to the outer raceway of the intermediate ring 16 and the outer ring 18. Accordingly, a rotation of the intermediate ring 16 effects a displacement of the axis of rotation 1 relative to the worm wheel 7. The center of rotation of the intermediate ring 16, that is to say the point about which the intermediate ring 16 is rotatable relative to the housing 9, lies centrally in the outer ring 18. It can be seen in FIG. 2 that said center of rotation lies within the inner rolling bearing 13, which is formed from the inner ring 14, the rolling bodies 15 and the inner raceway of the intermediate ring 16. The spatial distance between said two centers of rotation may be referred to as the eccentricity of the intermediate ring 16, and said eccentricity is, in the present case, smaller than the radius of the inner raceway of the intermediate ring 16. Such a small eccentricity is preferred in this exemplary embodiment, as it permits particularly fine adjustment of the position of the worm shaft 2.

Figure 3:
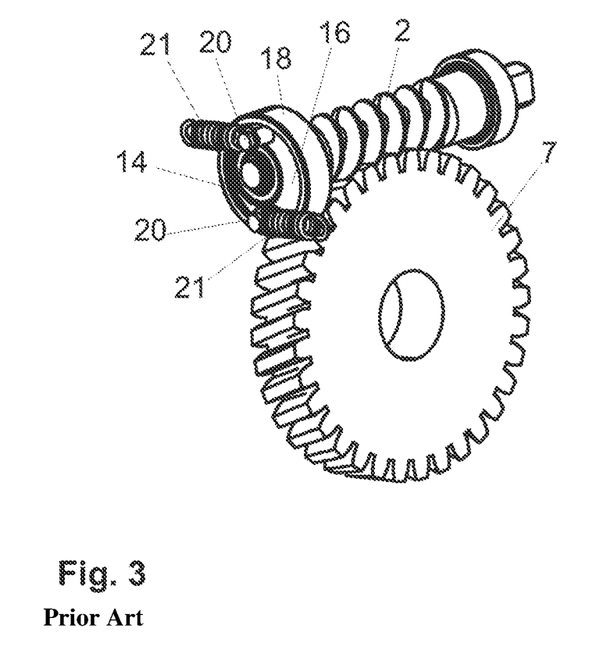
FIG. 3 is a perspective view of the prior art worm shaft of FIG. 2 with a spring preload means as shown in WO 2012/136315.

FIG. 3 shows the exemplary embodiment of FIG. 2 with two helical springs 21 which engage on the actuation elements 20. The actuation elements 20 are in this case in the form of pins which are arranged axially in parallel on the face side of the intermediate ring 16. The helical springs 21 impart a tensile action. In the exemplary embodiment as per FIG. 3, said helical springs force the intermediate ring 16 to rotate counterclockwise. As the center of rotation of the worm shaft 2 lies to the left adjacent to the center of rotation of the intermediate ring 16, the worm shaft 2 is forced against the worm wheel 7 by the springs.

Figure 4:
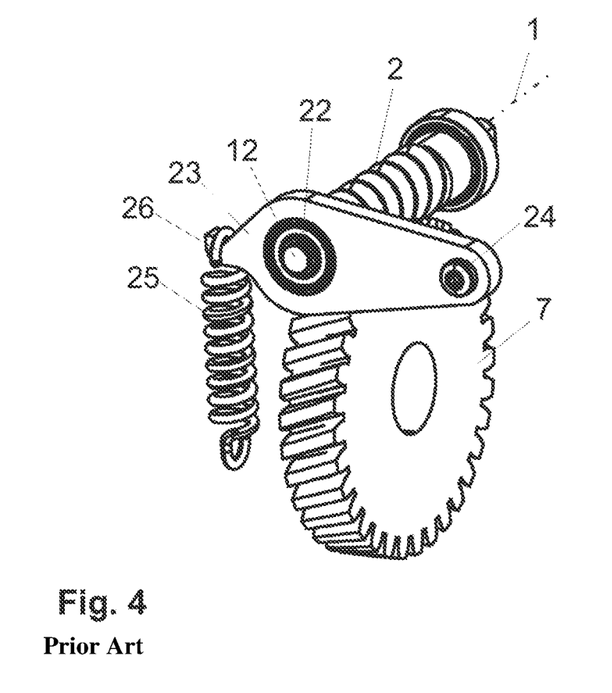
FIG. 4 is a perspective view of the prior art worm shaft of FIG. 3 from WO 2012/136315 in which a center of rotation of an eccentric member is situated outside the bearing of the worm shaft.

FIG. 4 shows an arrangement in which the worm shaft 2 is, at its free end 12, mounted rotatably in a conventional rolling bearing 22. The rolling bearing 22 is seated by way of its outer ring in an eccentric lever 23, which has a corresponding bearing seat. The eccentric lever 23 is mounted, at a pivot axis 24, in the housing 9 (not illustrated here). A helical spring 25, which in turn imparts a tensile action, engages on a hook-shaped end 26 of the eccentric lever 23, said end being situated opposite the pivot axis 24. The bearing 22 is arranged between the pivot axis 24 and the hook 26. In FIG. 4, the tensile spring 25 acts downwardly, that is to say pulls the eccentric lever 23 and thus the worm shaft 2 toward the worm wheel 7. In this way, too, an elastic preload of the worm shaft 2 against the worm wheel 7 is realized. As in FIG. 3, play-free meshing of the worm shaft 2 with the worm wheel 7 is thus realized.

By contrast to the embodiments in FIG. 2 and FIG. 3, it is the case in the embodiment as per FIG. 4 that the bearing 22 and thus the axis of rotation of the worm shaft 2 move on a considerably larger radius, as the pivot axis 24 of the eccentric lever 23 is spaced apart further from the axis of rotation 1 of the worm shaft than in FIGS. 2 and 3. Here, it is the case in particular that the eccentricity, that is to say the spacing between the axis of rotation 1 and the pivot axis 24, is selected to be between one times and three times the diameter of the rolling bearing 22.

In the preceding prior art, the position of the worm shaft 2 relative to the worm wheel 7 is adjustable. Here, the adjustment is performed at that side of the worm shaft which is remote from the motor.

The following FIGS. 5 to 9 show the motor-side arrangement, according to the invention, of the adjustment apparatus.

Figure 5:
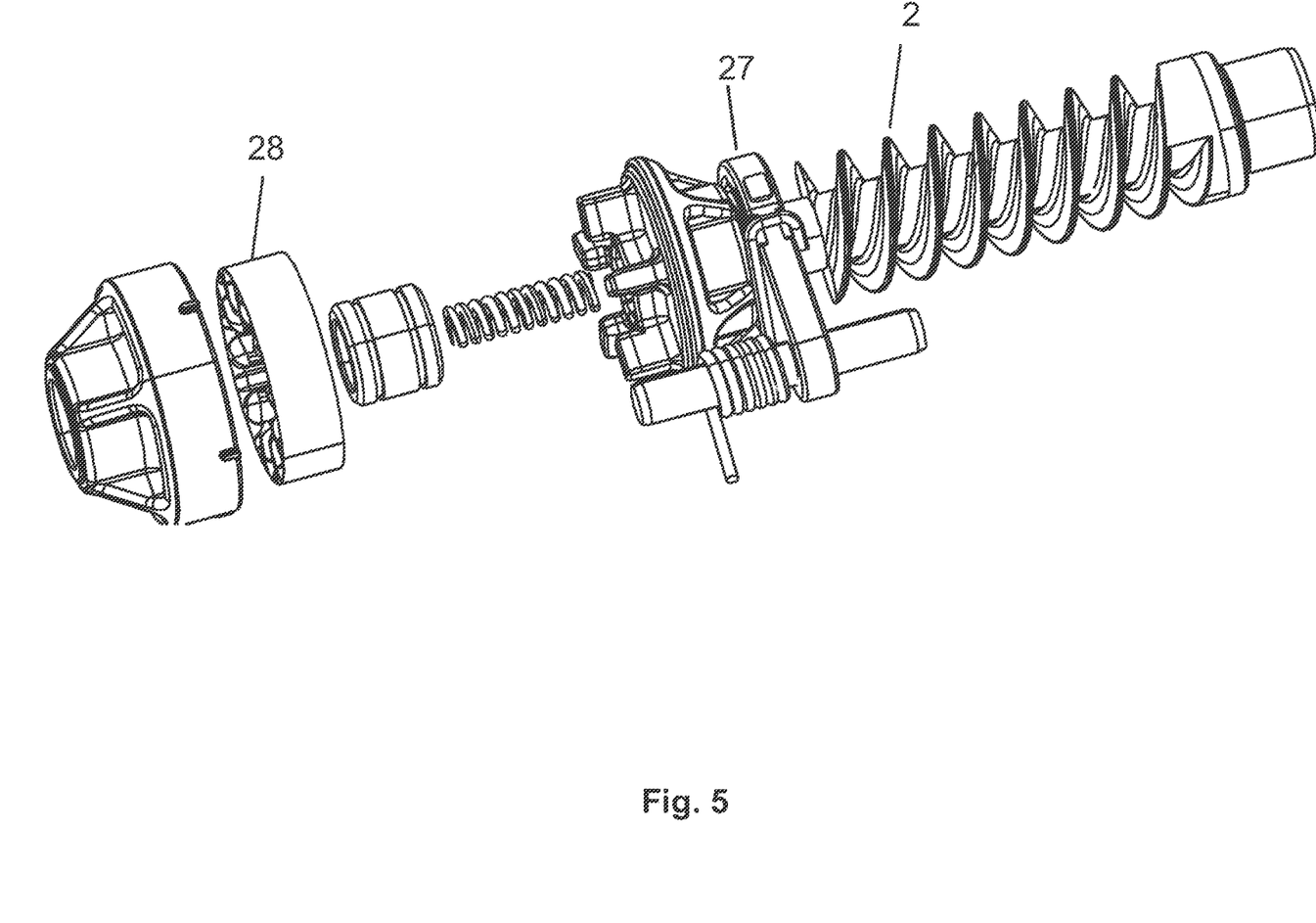
FIG. 5 is a perspective view of a bearing arrangement with a worm shaft in accordance with one example of the present disclosure.

The three-dimensional illustration of the bearing arrangement in FIG. 5 shows a motor-side arrangement of a spring-preloaded eccentric lever 27 on the worm shaft 2, and a coupling 28, which adjoins said eccentric lever in the motor-side direction and which compensates an axial offset, between the worm shaft 2 and the motor shaft (not illustrated here).

Figure 6:
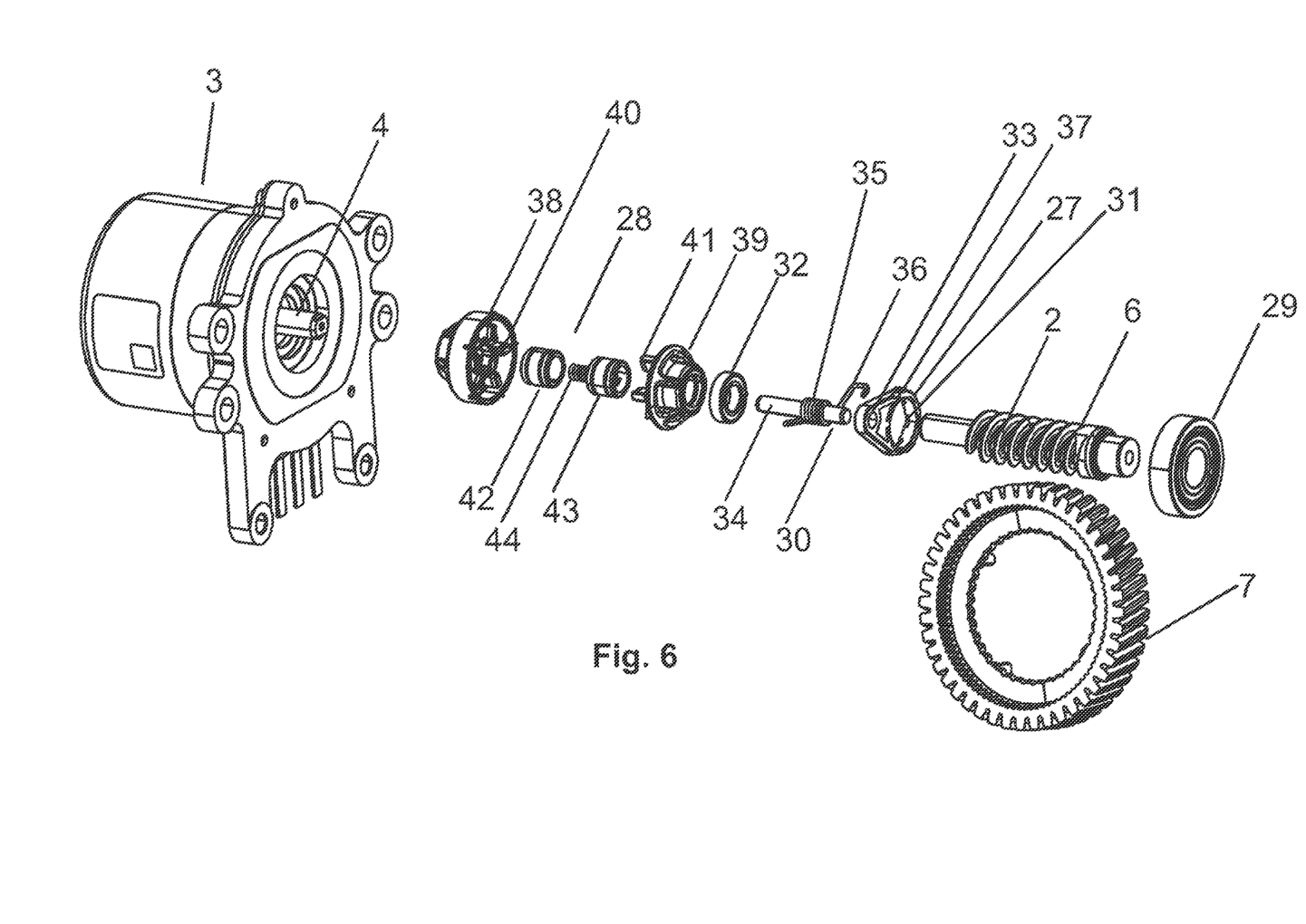
FIG. 6 is an exploded perspective view of the bearing arrangement of FIG. 5 with the worm shaft, a worm wheel, and an electric motor.

FIG. 6 shows the details of the bearing arrangement in an exploded illustration.

The electric motor 3 has the motor shaft 4, which is coupled rotationally conjointly to the worm shaft 2 by way of a flexible coupling 28. The worm shaft 2 meshes, by way of the worm toothing 6, with the worm wheel 7. The worm wheel 7 is in turn connected rotationally conjointly to a steering shaft (not illustrated) which runs between a steering wheel and the steering gear mechanism itself of the motor vehicle.

On that side of the worm shaft 2 which is remote from the motor there is provided a rolling bearing 29, which is in the form of a ball bearing and which permits small axial movements and small adjustments of the axis of rotation of the worm shaft 2 relative to the housing (not illustrated here). The preload between the worm shaft 2 and the worm wheel 7 is generated by way of the droplet-shaped eccentric lever 27 which is arranged perpendicular to the worm shaft 2 and which is connected to the housing (not illustrated here) by way of a bearing 30. The eccentric lever 27 has, in a circular region, a first opening 31 which receives a rolling bearing 32 arranged on the motor-side end of the worm shaft 2. The rolling bearing 32, in the form of a ball bearing, serves for rotatably mounting the worm shaft 2, and is seated by way of its outer ring in a corresponding bearing seat of the eccentric lever 27. In a narrowing region of the eccentric lever 27 there is provided a second, considerably smaller opening 33 for receiving a pin 34, which is arranged parallel to the worm shaft 2, of the bearing 30, whereby the eccentric lever 27 is mounted on the housing so as to be pivotable about a pivot axis. Here, a helical spring 35, which imparts a tensile action, concentrically surrounds the pin 34 and engages by way of a hook 36 on a notch 37 of the eccentric lever 27, said notch lying approximately in the plane of the worm wheel 7. By means of the tensile load of the helical spring 35, the pivotably mounted eccentric lever 27 is restricted in terms of its freedom of movement, and an elastic preload of the worm shaft 2 against the worm wheel 7 is realized. Toward the motor side, the worm shaft 2 and the eccentric lever 27 are adjoined by the coupling 28, which compensates an axial offset and which connects the worm shaft 2 rotationally conjointly to the motor shaft 4. Such couplings are known in the form of so-called "Oldham couplings". The coupling 28 is composed of two coupling parts 38, 39 which engage into one another and which have a concentric bearing seat 40, 41, wherein the engagement of the coupling parts 38, 39 exhibits play. The coupling parts 38, 39 are connected in positively locking fashion to the corresponding shaft 4, 2 by way of in each case one cylindrical bearing bushing 42, 43 arranged in the bearing seat 40, 41. The coupling parts 38, 39 are in this case preloaded axially by way of a concentrically arranged helical spring 44, which is arranged, between the coupling parts 38, 39, in the bearing bushings 42, 43. The coupling 28 which is shown is rotationally fixed and, by way of the play of the engagement of the coupling parts 38, 39, an axial offset between the axis of rotation of the motor shaft 4 and the axis of rotation of the worm shaft 2 can be compensated.

Figure 7:
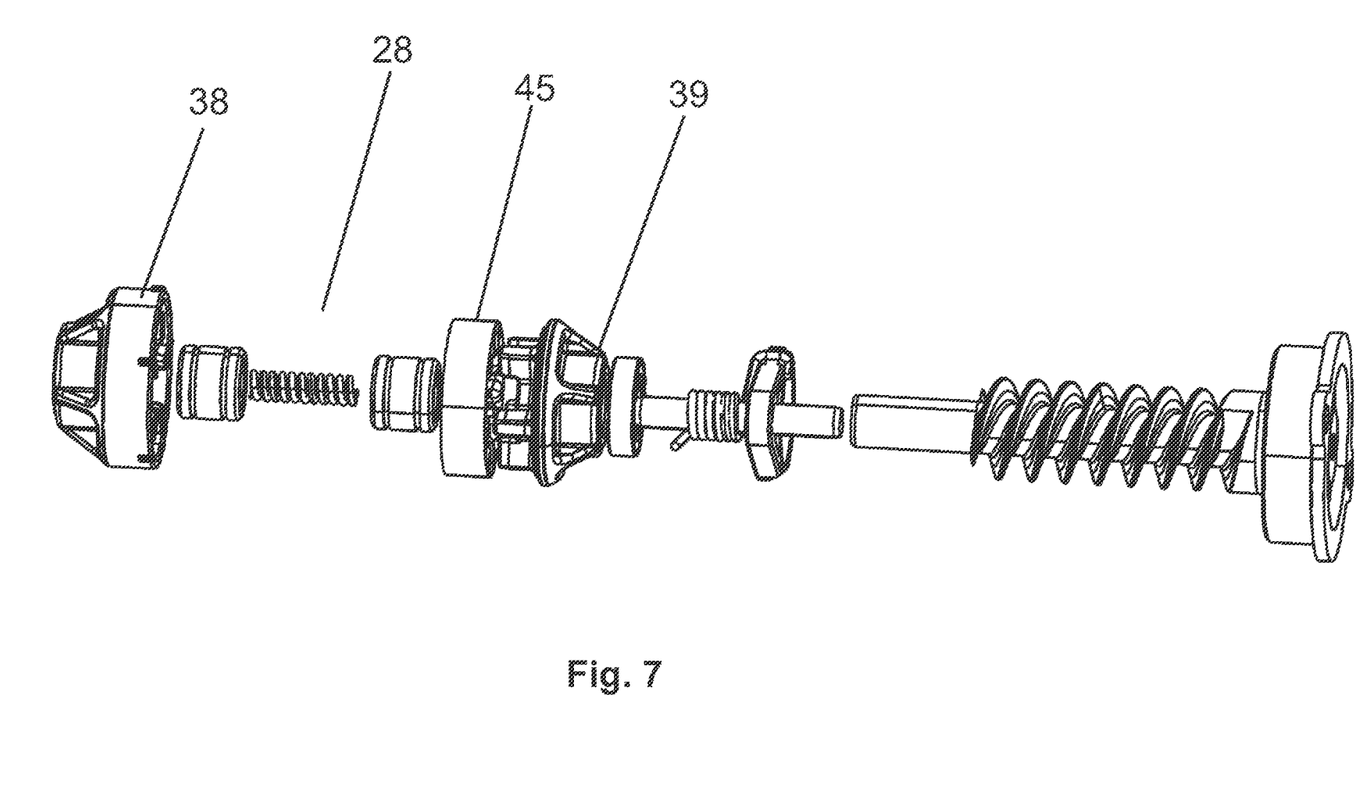
FIG. 7 is an exploded side-perspective view of the bearing arrangement and the worm shaft of FIG. 5.
Figure 8:
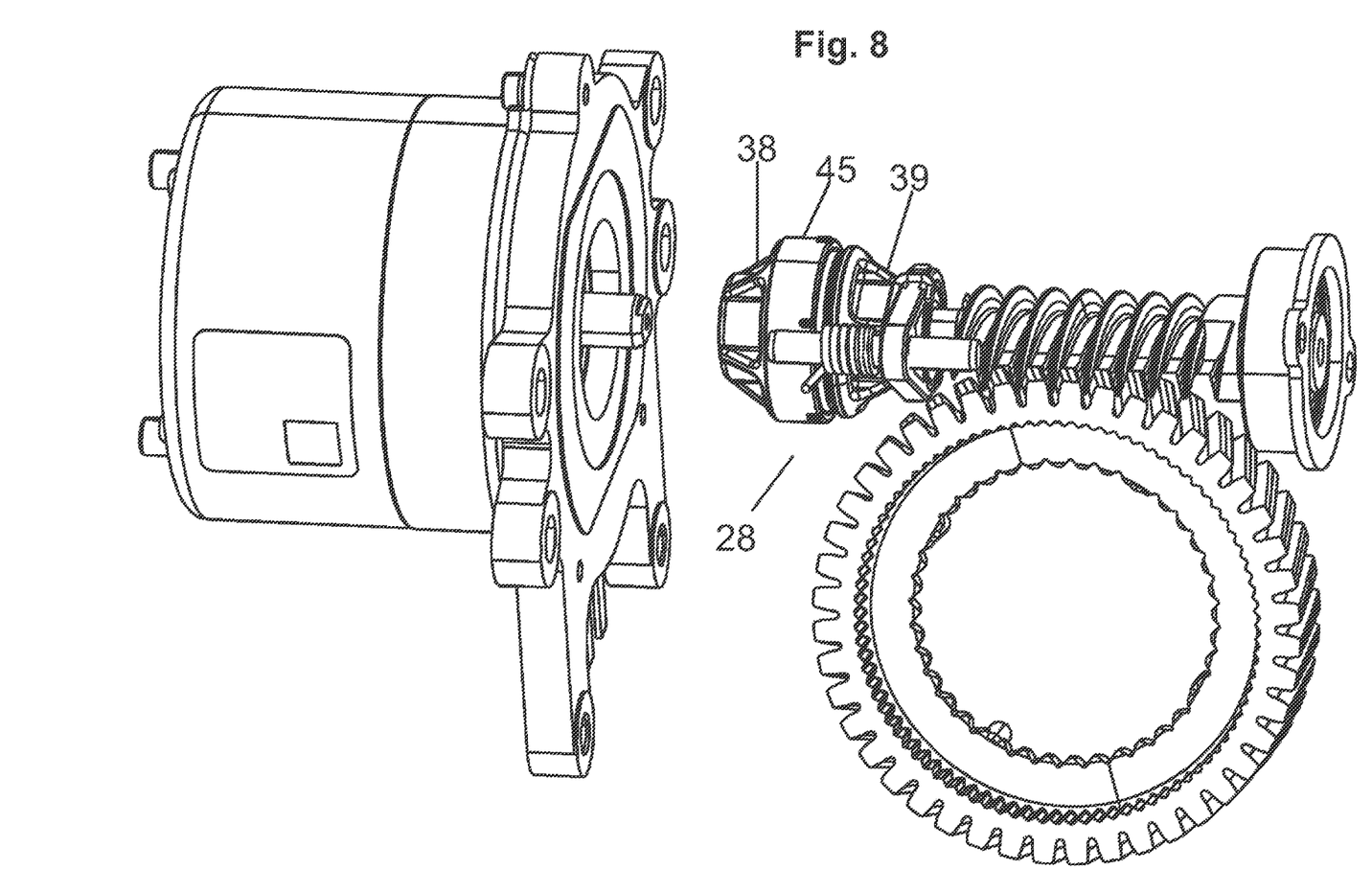
FIG. 8 is an exploded perspective view of the bearing arrangement of FIG. 5 with the worm shaft, the worm wheel, the electric motor, and an assembled coupling.
Figure 9:
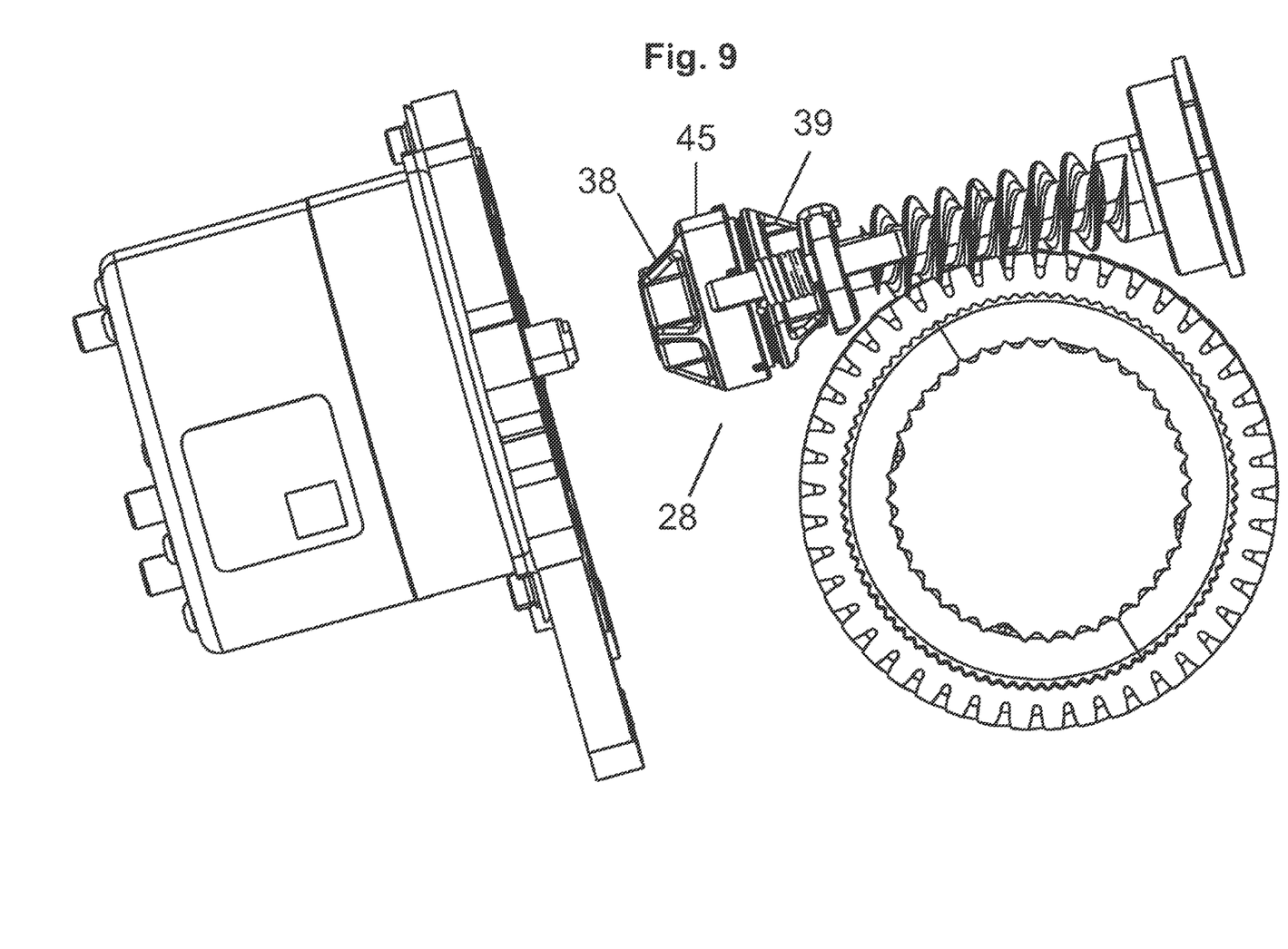
FIG. 9 is a partially-exploded side view of the bearing arrangement of FIG. 5 with the worm shaft, the worm wheel, the electric motor, and the assembled coupling.

FIGS. 7, 8 and 9 show the embodiment of FIG. 6 in different views, wherein the illustration additionally shows an elastomer damping means 45 of the coupling 28, which elastomer damping means dampens the play of the coupling parts 38, 39 which engage into one another.

By means of the motor-side eccentric lever 27 and the coupling 28, a worm shaft bearing arrangement is realized in which both the axial play and the radial play are automatically adjustable.

We claim:

1. An electromechanical servo steering system comprising:
   a worm wheel arranged on a steering shaft, with the worm wheel being operatively connected to an input shaft of a steering gear mechanism;
   a worm shaft that meshes with the worm wheel, the worm shaft and the steering shaft being rotatably mounted in a common gear mechanism housing;
   an electric servomotor for driving the worm shaft, wherein the worm shaft includes a first end and a second end, the first end being distal from the electric servomotor and mounted in a first rolling bearing, the second end being proximate to the electric servomotor and having a second rolling bearing that is received in an eccentric lever; and
   a bearing that pivotably fastens the eccentric lever to the common gear mechanism housing, wherein the bearing comprises a pin surrounded by a helical spring having a hook, the pin serving to mount the eccentric lever pivotably to the common gear mechanism housing, wherein the hook of the helical spring engages a notch of the eccentric lever and torques the eccentric lever.

2. The electromechanical servo steering system of claim 1 wherein a side of the eccentric lever that faces the electric servomotor includes a coupling that compensates for an axial offset.

3. The electromechanical servo steering system of claim 1 wherein a side of the eccentric lever that faces the electric servomotor includes a coupling that compensates for an axial offset.

4. The electromechanical servo steering system of claim 1 wherein a side of the eccentric lever that faces the electric servomotor includes a coupling that compensates for an axial offset.

5. The electromechanical servo steering system of claim 1 wherein the eccentric lever is torqued by the helical spring such that the worm shaft is forced to engage with the worm wheel.

6. The electromechanical servo steering system of claim 5 wherein a side of the eccentric lever that faces the electric servomotor includes a coupling that compensates for an axial offset.

7. The electromechanical servo steering system of claim 6 wherein the coupling of the side of the eccentric lever comprises a first coupling part and a second coupling part that engage into one another, wherein the first coupling part is rotatably connected to a motor shaft of the electric servomotor with a first bearing bushing, wherein the second coupling part is rotatably connected to the worm shaft with a second bearing bushing.

8. The electromechanical servo steering system of claim 7 further comprising a helical spring disposed within the first and second bearing bushings, the helical spring for torqueing the worm shaft axially relative to the worm wheel.

9. The electromechanical servo steering system of claim 7 wherein the first and second coupling parts engage into one another with a degree of play that compensates for an axial offset.

10. The electromechanical servo steering system of claim 9 further comprising a helical spring disposed within the first and second bearing bushings, the helical spring for torqueing the worm shaft axially relative to the worm wheel.

11. The electromechanical servo steering system of claim 9 wherein the coupling comprises an elastomer damping means for dampening the play that exists between the first and second coupling parts.

12. The electromechanical servo steering system of claim 11 further comprising a helical spring disposed within the first and second bearing bushings, the helical spring for torqueing the worm shaft axially relative to the worm wheel.

\* \* \* \* \*